United States Patent [19]

Richard

[11] 4,111,601
[45] Sep. 5, 1978

[54] ADJUSTABLE WINDMILL

[76] Inventor: Joseph G. Richard, 357 South St., Hyannis, Mass. 02601

[21] Appl. No.: 764,754

[22] Filed: Feb. 2, 1977

[51] Int. Cl.² .............................................. F03D 7/04
[52] U.S. Cl. ...................................... 416/41; 416/53; 416/139
[58] Field of Search ................. 416/132 B, 41, 50, 51, 416/23, 139, 53, 155, 158, 193 R

[56] References Cited

U.S. PATENT DOCUMENTS

| | | | |
|---|---|---|---|
| 17,384 | 5/1857 | Mitchell | 416/139 |
| 1,461,048 | 7/1923 | Roman | 416/51 |
| 1,793,653 | 2/1931 | Turnbull | 416/155 |
| 2,037,528 | 4/1936 | Miller | 416/23 |
| 2,058,500 | 10/1936 | Plucker | 416/DIG. 7 X |
| 2,074,149 | 3/1937 | Jacobs | 416/23 X |
| 2,126,202 | 8/1938 | McColly | 416/51 |
| 2,152,984 | 4/1939 | Wilford | 416/24 X |
| 4,003,676 | 1/1977 | Sweeney et al. | 416/158 X |

FOREIGN PATENT DOCUMENTS 361,857 10/1922 Fed. Rep. of Germany ....... 416/132 B

*Primary Examiner*—Everette A. Powell, Jr.
*Attorney, Agent, or Firm*—Maurice R. Boiteau

[57] ABSTRACT

There is disclosed in the present application a windmill including a wheel having a set of fixed blades and a set of movable vanes whose angular orientation with respect to the axis of the wheel is adjusted automatically for limiting the speed of the wheel to a safe level in winds of high velocity. The fixed blades may be installed to cause turning of the wheel under generally prevailing winds of a very low velocity. The movable vanes are connected to a speed sensing governor mechanism which changes their orientation from positive through neutral to negative for reducing the speed of the wheel when the wind velocity is excessive and the mill would otherwise reach damaging speeds. In addition, there is disclosed a mechanism for changing the orientation of the vanes from a remote location to stop the wheel. The mill wheel is also constructed in modular segments adapted to being shipped in sections and assembled at the operating site.

5 Claims, 8 Drawing Figures

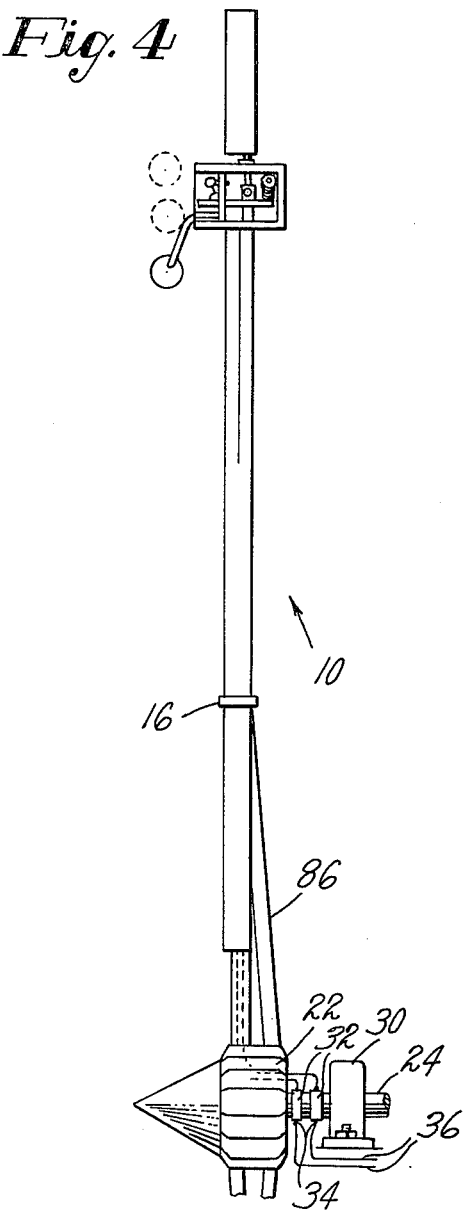
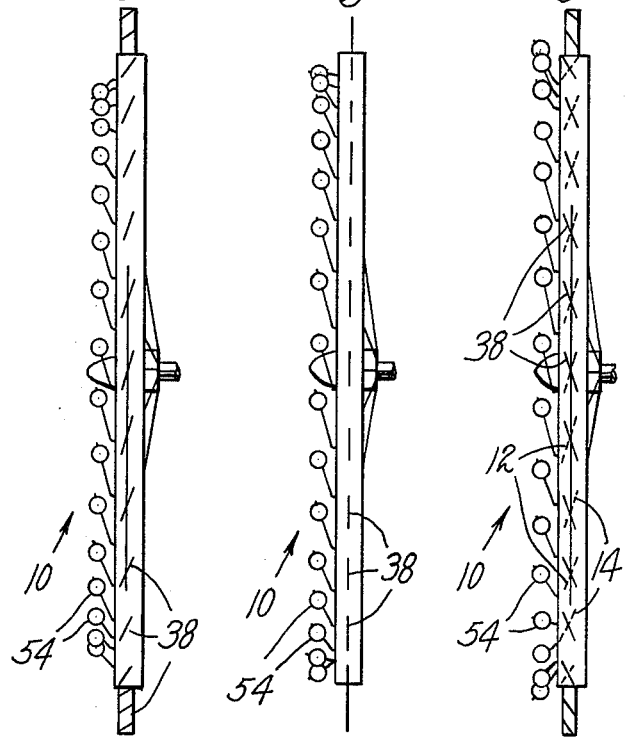
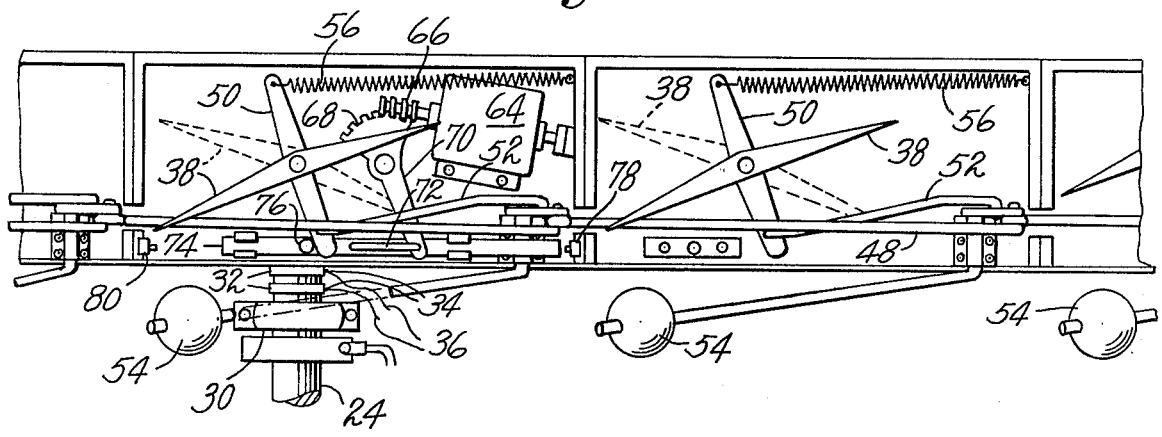

ADJUSTABLE WINDMILL

The present invention relates generally to improvements in windmills and more particularly to windmills including a wind wheel and means for sensing the rotary speed of the wheel and modifying its efficiency in accordance with the attained speed.

In order to operate a windmill at maximum overall efficiency, it is necessay that the wind wheel be so constructed that it is caused to turn by light winds to perform some work much of the time. However, such a wind wheel, if not otherwise controlled, tends to increase its rotary speed beyond a safe limit during strong gusts of wind. Heretofore, in order to avoid destructively high wheel speeds, the choice has been on the one hand, between configurations which are inefficient at low wind velocities or self destructive at high wind velocities or on the other hand, complicated and expensive speed sensing and regulating mechanisms which impose severe limitations on practical windmill design and size.

It is accordingly an object of the present invention to improve the overall efficiency of windmills by permitting a blade arrangement which derives rotation from very light winds.

Another object is to prevent the destruction of windmills by limiting their maximum speed attained in high winds, to a safe level.

A further object is to provide a construction suitable for large size wind wheels which may be readily transported and easily assembled at the operating site.

The foregoing objects are achieved in accordance with the present invention by a wind wheel design comprising a plurality of fixed blades oriented to cause the wheel to turn under light winds prevailing at the installation site. According to a feature of the invention, the wheel includes a plurality of movable vanes, typically, one aligned with each fixed blade and relatively short when compared with the length of the fixed blades. In accordance with a related feature, all the vanes are connected to a governor mechanism which reacts to increases in wheel speed and causes the vanes to assume positions which reduce the overall efficiency of the wheel as wind speed increases.

The foregoing objects and features of the invention, together with numerous advantages to be derived from it, will be more fully understood from the following detailed description of an illustrative embodiment taken in connection with the accompanying drawings in which:

FIG. 4 is a fragmentary view in right side elevation depicting a part of a wind wheel;

FIGS. 5, 6 and 7 are schematic views respectively depicting positive, neutral and negative positions of the movable vanes under conditions of low, medium and high wind velocities; and FIG. 8 is a plan view of the wheel with an outer rim removed for clarity and showing details of a remotely controlled mechanism for stopping the wind wheel.

Figure 1:
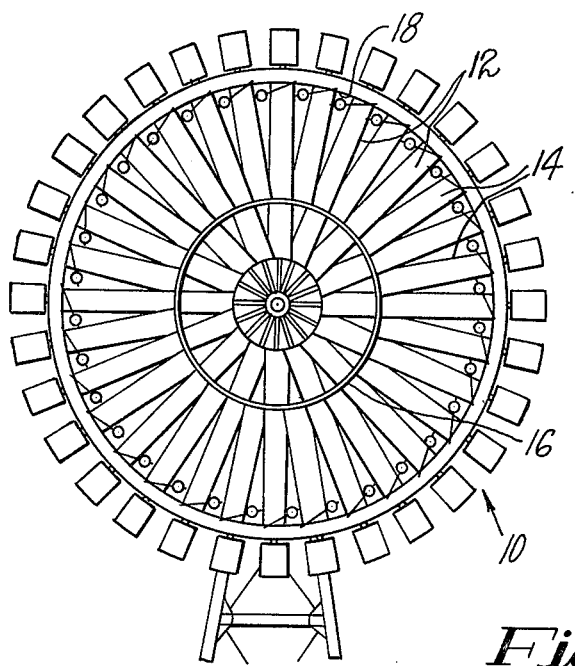
FIG. 1 is a view in front elevation of a windmill including a wheel according to the present invention.
Figure 2:
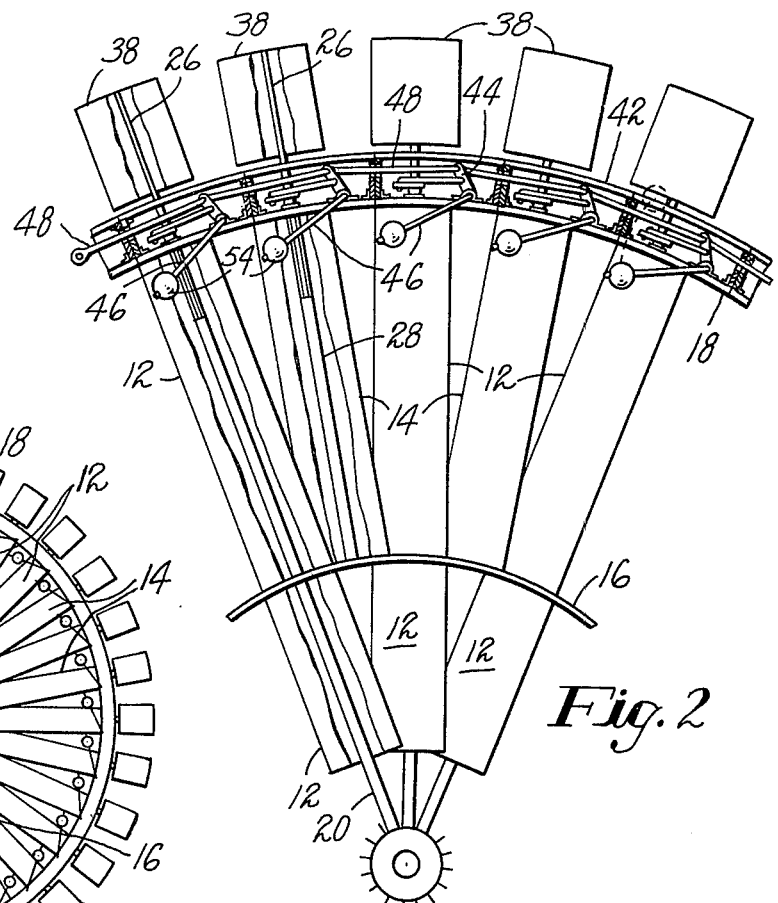
FIG. 2 is a fragmentary view also in front elevation showing a portion of the wheel of FIG. 1 but on a larger scale illustrating construction details of a speed-responsive governor mechanism.

Turning now to the drawings, particularly FIGS. 1 and 2, there is shown a windmill including a wind wheel indicated generally at 10 and comprising a plurality of blades alternating between full and partial blades 12 and 14 supported by an intermediate hoop 16 and an inner rim 18. The full blades 12 are mounted on tubular supports 20 radiating from a hub 22 secured to a shaft 24 as also seen in FIG. 4. The supports 20 extend through the hoop 16 and are secured to the inner rim 18, providing a journal for vane actuating shafts 26 which will be described in greater detail below. Each full blade 12 consists of two portions, an inner one within the hoop 16 and an outer one between the hoop 16 and the inner rim 18, both parts of the blade being generally given a common orientation with respect to the plane of the wheel or the axis of the shaft 24 when the wheel is assembled at the operating site. The partial blades 14 extend only between the hoop 16 and the inner rim 18, each being fixed upon its short tubular support 28 which extends between the hoop and the inner rim and also provides a journal for a shaft 26.

The shaft 24 is rotatably mounted in a pair of spaced apart bearing blocks only one of which is shown at 30. Mounted on the shaft 24 is a pair of slip rings 32 contacted by a pair of brushes 34 connected by wires 36 to a remote station for stopping the rotation of the wind wheel by electrical control as will hereinafter be described.

Mounted on each shaft 26 in alignment with each full blade 12 and each partial blade 14 is a movable vane 38 which is automatically positioned in a positive, neutral or negative orientation as shown respectively in FIGS. 5, 6 and 7. Thus under light wind conditions, the vanes 38 have a positive left hand orientation, that is, the front surfaces of the vanes which are represented by lines in FIG. 5 extend to the left as their wind-engaging front surface recedes from the front of the wheel. This orientation which is essentially the same as that of the blades 12 and 14 as shown in dotted lines in FIG. 7 is positive in that it assists in causing the wind wheel 10 to rotate in a clockwise direction as seen in FIG. 1. A medium increase in wind velocity which causes the wheel speed to increase to a mid-range causes the vanes 38 to become oriented generally in an axial plane as shown in FIG. 6. In this condition, the vanes 38 are neutral in that they neither assist nor hinder the effect of the blades 12 and 14 in causing the wheel to turn. When the wind velocity increases further, the vanes 38 assume a negative right hand position as shown in FIG. 7 in which they partially cancel out the torque provided by the effect of the wind upon the blades 12 and 14 and thus further limit the wheel speed.

Figure 3:
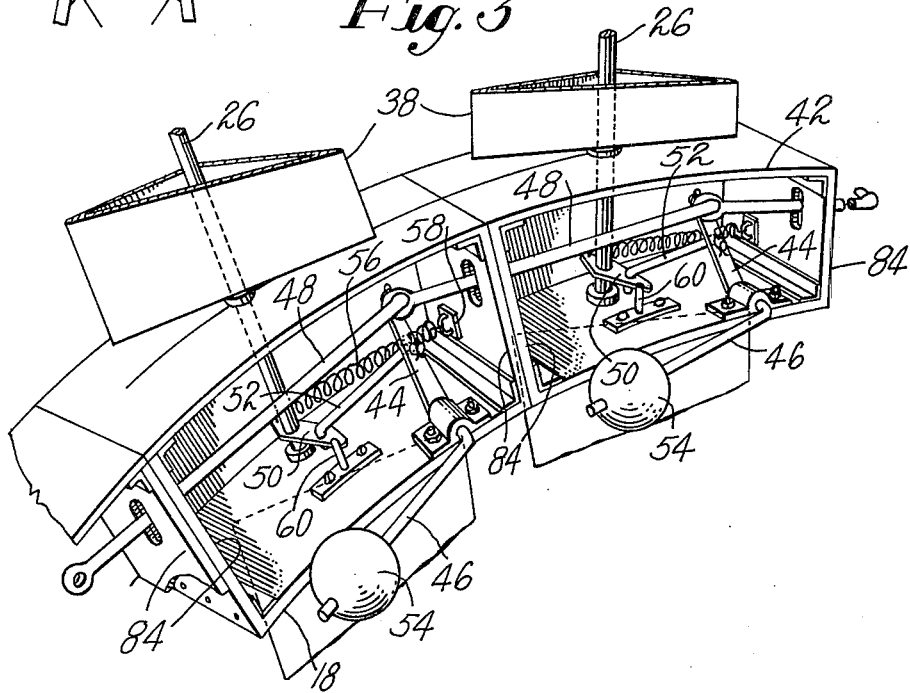
FIG. 3 is a fragmentary view in perspective and on a greater scale than FIG. 2 showing a portion of the governor mechanism and its connection to the movable vanes of the wind wheel.

Connected to the shafts 26 for changing the orientation of the vanes 38 in response to differences in wind wheel speed is a governor mechanism enclosed between the inner rim 18 and an outer rim 42 as best seen in FIGS. 2, 3 and 8. The mechanism which comprises a plurality of like sections or modules includes in each section a bell crank having a generally radially directed arm 44 and a weight supporting arm 46 extending in a direction generally normal to the arm 44. Each arm 44 is interconnected by means of links 48 with adjacent similar radial arms 44. An intermediate point on each arm 44 is interconnected with a lever 50 secured to an adjacent shaft 26 by a link 52. Adjustably positionable along the length of each arm 46 is a weight 54 which determines the proportion between the speed of the wind wheel 10 and the orientation of the vanes 38. As the speed of the wheel increases, the weights 54 are urged outwardly by centrifugal force causing the arms 44 to move in a clockwise direction, as seen in FIG. 3, against the action of a counter-acting tension spring 56 stretched between each lever 50 and a fixed anchor 58. When the weights 54 are positioned closer to the distal ends of the arms 46, the effect is to change the orientation of the vanes 38 under lower speed conditions. When the wheel is operating at a low speed and the governor has no effect upon the position of the vanes, the vanes are oriented by the springs 56 which maintain the levers 50 in abutment with fixed stops 60 secured to the inner rim 18.

For stopping the rotation of the wind wheel from a remote location, there is provided a mechanism including a motor 64 seen in FIG. 8 upon whose shaft is mounted a worm 66 engaging a sector 68 forming one arm of a lever having a second arm 70 connected by a link 72 to a slide 74. Upstanding from the slide 74 is a pin 76 which engages the arm of the lever 50 to which the link 52 is connected. While the wheel 10 is in motion and the vanes 38 are in the positive position depicted in dash lines in FIG. 8, actuation of the motor 64 causes the slide 74 to move to the position depicted in solid lines in FIG. 8 and the vanes to assume their negative position, also shown in solid lines in that view, and thereby to stop the wheel. Motion of the slide 74 to the extreme right causes the pin 76 to engage the arm of the lever 50 to cause turning of the vanes and at the end of its travel to engage a reversing switch 78 which performs the dual functon of interrupting the electrical connection to the motor 64 and also to reverse the connections so that the next time the motor is actuated its direction of rotation is reversed. Another reversing switch 80 is located to be engaged by the slide 74 when it is moved to the other extreme of its travel and performs the same functions as the switch 78. The circuit including the motor 64 and the switches 78 and 80 is connected through the slip rings 32 and the wires 36 to a power source through a remote control switch, not shown, mounted at a location from which the operation of the wind wheel is to be controlled by closing the remote switch momentarily for each operation of the motor 64. The weight of the remote control mechanism including the motor 64, the slide 74 and the switches 78 and 80 is offset to maintain the wheel's balance by an appropriate counterweight mounted diametrically opposite the mechanism.

It will be appreciated that although the governor mechanism affects the rotation of the wheel 10 in a proportional manner, the motor 64, when actuated, causes the vanes 38 to turn immediately and directly to their most negative position thereby bringing the wheel to a stop. Thus, the governor causes the overall efficiency of the wheel to be reduced inversely with its speed but the stopping mechanism turns the vanes 38 to their most negative positions regardless of wheel speed. It is also possible to assist the remotely controlled mechanism by adding an electrically operated brake mounted on the shaft 24 to stop the rotation of the wheel and to keep it stopped.

In order to facilitate transportation of particularly large wind wheels according to the present invention, the inner and outer rims 18 and 42 are segmented into a plurality of light modules. As shown in the drawings, each blade 12 and 14 is coupled to a section of inner and outer rims secured to adjacent modules by bolting through end walls 84. All the modules may be shipped separated and later joined at the operating site or several modules may be shipped already joined in a group and the groups assembled at the operating site. The assembly in addition to bolting adjacent sidewalls together includes the securement of the tubular supports 20 and 28 to the hub 22 and the inner rim 18 and the installation of a plurality of equally spaced braces 86 between the hoop 16 and the hub 22.

In interpreting the scope of the present invention, it will be appreciated that certain changes in details of construction may be made without departing from the scope of the invention. Thus, for example, the arrangement of blades 12 and 14 alternating between full and partial blades may be changed by providing a complete set of full blades each of which is tapered in width near the hub 22. Another variation of the present disclosure may be in the relationship of one vane 38 and one weight 54 for each blade of the wind wheel 10. It will be appreciated that the number of weights 54 and the number of vanes 38 may be changed, not necessarily to the same number of weights as of vanes, without departing from the spirit of the invention. Accordingly, it will be understood that the embodiment, which has been described in detail, is presented for purposes of illustration and that the scope of the invention is defined only in terms of the appended claims.

Having thus disclosed my invention, what I claim as new and desire to secure by Letters Patent of the United States is:

1. A wind wheel adapted to being driven by the wind, comprising means defining an axis about which the wheel is adapted to rotate, a pair of radially spaced apart segmented rims, a set of generally equally spaced, radially mounted blades equal in number to the segments of each of the rims mounted inside the inner rim and having a front wind engaging surface oriented with respect to the axis to cause the wheel to rotate when subjected to wind directed generally along the axis, a plurality of interconnected movable vanes, one corresponding to each blade and each segment of each rim, mounted on the wheel outside the blades and a governor mechanism including a number of weights equal to the number of blades and connected to the vanes for sensing the speed of the wheel and adjusting the orientation of the vanes with respect to the axis to change the efficiency of the wheel in inverse proportion to its speed.

2. A wind wheel according to claim 1 further characterized in that the governor mechanism is mounted on the wheel between the blades and the vanes.

3. A wind wheel according to claim 2 further comprising a hub, and a support for each blade secured between the hub and the inner rim.

4. A wind wheel according to claim 3 further characterized in that the supports are tubular and further comprising a plurality of shafts journalled in the tubular supports and having a vane secured to each shaft.

5. A wind wheel according to claim 1 further characterized in that the governor mechanism is disposed in the form of a ring around the set of blades and in which the weights are generally equally spaced and each is adjustably mounted on an arm of a bell crank and oriented with respect to the axis to be displaced outwardly by centrifugal force as the wheel rotates and further comprising a generally radial arm on each bell crank and a plurality of links interconnecting the radial arms.

* * * * *